May 2, 1961 W. R. HUNZIKER 2,982,290
PORTABLE PREFABRICATED SHELTER
Filed Jan. 8, 1958 4 Sheets-Sheet 1

INVENTOR.
Walter R. Hunziker
BY
ATTORNEYS

May 2, 1961  W. R. HUNZIKER  2,982,290
PORTABLE PREFABRICATED SHELTER
Filed Jan. 8, 1958  4 Sheets-Sheet 2

INVENTOR.
Walter R. Hunziker
BY
ATTORNEYS

May 2, 1961
W. R. HUNZIKER
2,982,290
PORTABLE PREFABRICATED SHELTER
Filed Jan. 8, 1958
4 Sheets-Sheet 3
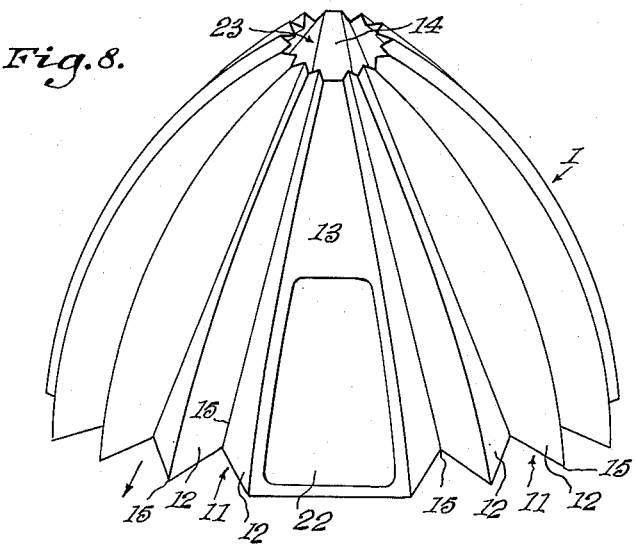
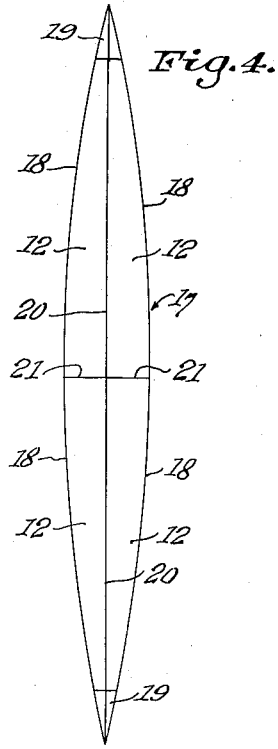
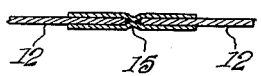
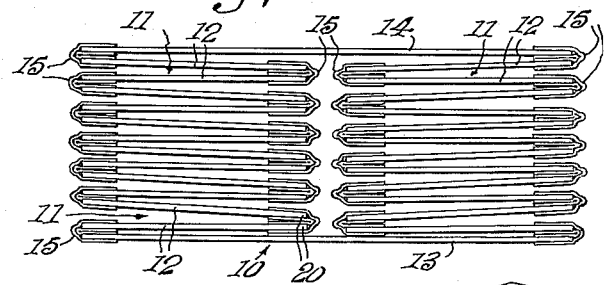
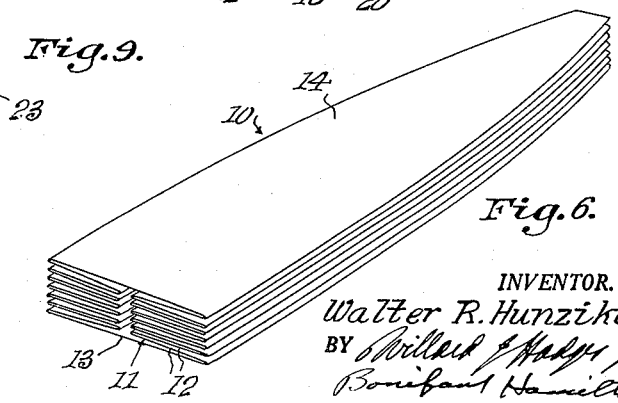
INVENTOR.
Walter R. Hunziker
BY
ATTORNEYS May 2, 1961 W. R. HUNZIKER 2,982,290
PORTABLE PREFABRICATED SHELTER
Filed Jan. 8, 1958 4 Sheets-Sheet 4

INVENTOR.
Walter R. Hunziker
BY
ATTORNEYS

United States Patent Office 2,982,290
Patented May 2, 1961

2,982,290

PORTABLE PREFABRICATED SHELTER

Walter Rudolf Hunziker, 1937 Fairview Road NE., Atlanta, Ga.

Filed Jan. 8, 1958, Ser. No. 707,836

14 Claims. (Cl. 135—1)

(Granted under Title 35, U.S. Code (1952), sec. 266)

The invention described herein may be manufactured and used by or for the Government for governmental purposes without the payment of any royalty thereon.

The present invention relates to improvements in portable prefabricated shelters and more particularly to a prefabricated shelter structure that can be folded in its entirety or by sections to assume a portable condition. Still more specifically, the invention relates to a foldable, portable, prefabricated, self-supporting shell having minimum erection and folding times.

This invention, because of its ease of installation and speed of packing accompanied by a relatively low total weight, is particularly adapted to incorporation in personnel shelters to be used in situations permitting only short periods of use in one place and requiring repeated relocations. These attributes are of particular value in many circumstances as, for example, under arctic conditions and in military use in proximity to an enemy.

The most common form of existing portable shelters has been the tent type structure consisting of a limp skin superimposed on a rigid or semi-rigid frame permitting the shelter to be carried or stored in disassembled form. A modification of the tent appears in structures having a limp skin permanently secured to a folding frame that operates in the fashion of an umbrella. Other types of existing portable shelters are found in agriculture covers as tree or stack covers or portable auto covers where the item protected forms the support for the shelter.

An important object of this invention is to provide a quickly erected and quickly collapsed, foldable, prefabricated shelter shell.

Another object of this invention is to provide a foldable prefabricated shelter that will be operable as a result of the characteristics of its own shell and without use of an interior or exterior ancillary supporting frame or members.

Another object of this invention is to provide a foldable, prefabricated, self-supporting structure wherein all stresses to maintain its attitude, shape, and load capacity are obtained from the resiliency of the material used and the geometry of the segments.

Another object of this invention is to provide a foldable, prefabricated, self-supporting, self-stressing structure wherein stressing as a result of the resiliency of the material and the geometry of the segments is activated by the toggle action of two segments riding over each other and the snap action of a portion of a segment passing through a state of compression to a state of tension.

Still another object of this invention is to provide a light weight collapsible troop shelter having minimum times of erecting and packing.

Other objects and advantages of the invention will be apparent as the description proceeds and the features of novelty will be pointed out in detail in the appended claims.

Briefly, in accordance with this invention, there is provided a unitary, collapsible, self-supporting, prefabricated shelter constructed of panel members hinged together in such a way that the panels are in an unstressed condition of repose when the shelter is collapsed but are supported in the erected position by stresses which are created by deformation of the material of the panels as a result of their configuration and which are retained by the resiliency of the panels. This invention is most easily embodied in shelters conforming to regular curved surfaces of revolution having an even number of equal symmetrical panels of normally planar resilient material and predetermined size joined in abutting edge fashion by flexible hinges. Depending on the particular shape selected, all or less than all of the panels may be divided into half panels also hinged together along the panel axis or center line roughly parallel to the hinged panel edges. The hinges or fold lines are arranged so that straight edge hinges joining mating half panels move inwardly and the hinges of curved edges between abutting panels move outwardly when the shell is folded by the flexing of all hinges.

In the accompanying drawings, forming a part of this specification and wherein like numerals are employed to designate like parts throughout the same—

Fig. 4 is a plan view of a blank of material partially shaped into panels;

Fig. 5 is an enlarged fragmentary view taken on line 5—5 of Fig. 3 showing a cross section of a hinge taken normal to the axis of the hinge;

Fig. 6 is a perspective view of a shell according to a preferred embodiment of the invention in a completely folded position;

Fig. 7 is an enlarged end view of a folded shell corresponding to an elevation of the left end of the folded shell as illustrated in Fig. 6;

Fig. 8 is a diagrammatic perspective of the shell of Fig. 2 in a partially folded condition, or conversely an opened but unstressed condition;

Fig. 9 is a diagrammatic bottom view of one-half of the shell of Fig. 2 showing a semi-folded condition of the shell in broken lines;

Figure 2:
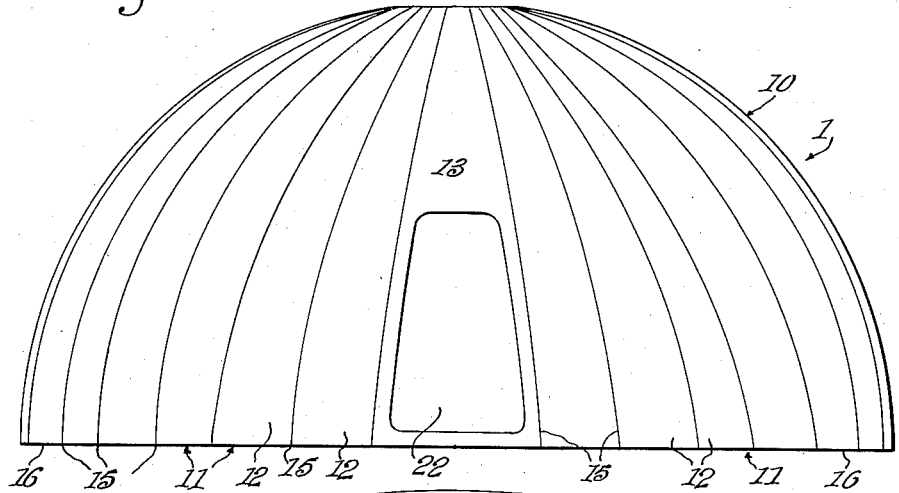
Fig. 2 is a front elevation of an erected shell according to a preferred embodiment of the invention.
Figure 3:
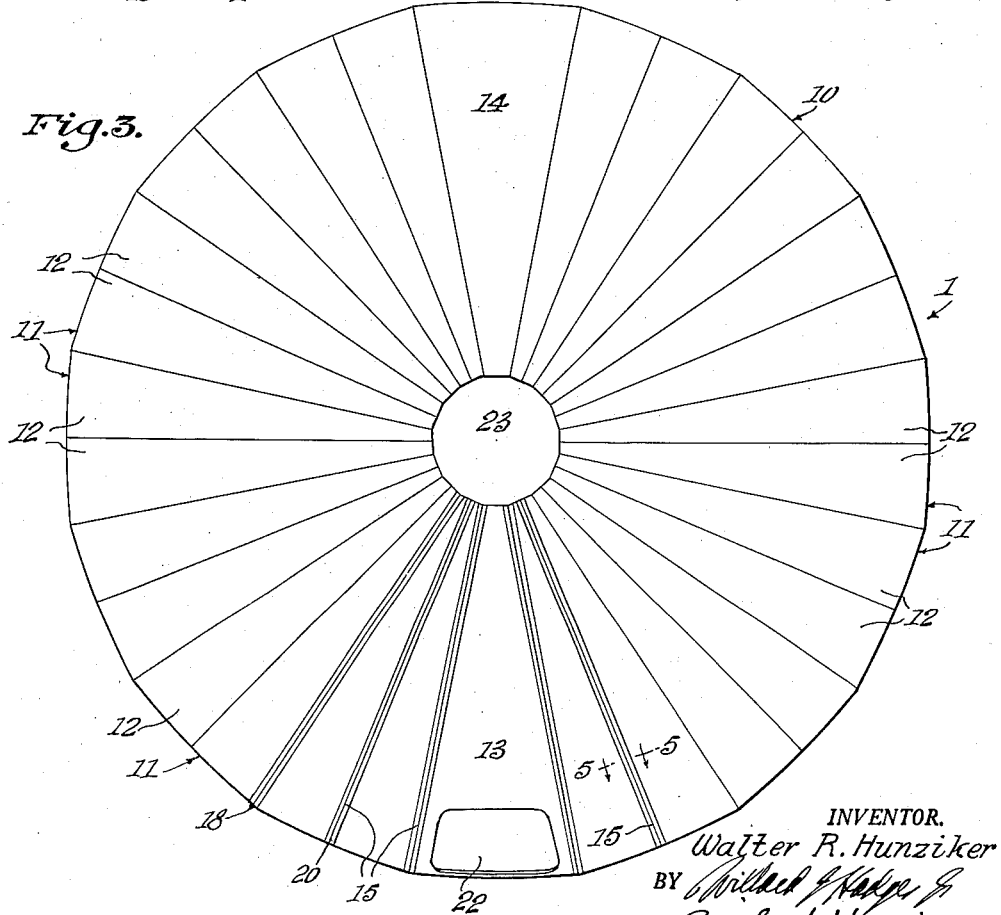
Fig. 3 is a top plan view of the shell of Fig. 2.

In the drawings, wherein for the purpose of illustration there are shown preferred embodiments of the invention, a portable self-supporting shelter is indicated generally by numeral 1. As illustrated in Figs. 2 and 3, this preferred embodiment of shelter 1 is of approximately hemispheroidal configuration although the invention is equally applicable to an ellipsoid, paraboloid or other simple or compound curved surface or any concavo-convex shapes. The shell or wall 10 of shelter 1 is made up of panels 11, the majority of which are subdivided into half panels or portions 12. All panels and half panels or portions are connected together by elongated hinges 15, several of which are shown in Fig. 3. Diametrically opposed panels 13 and 14, for purposes which will become evident later, are not subdivided in the preferred embodiment. Each panel 11, 13, and 14, and each half panel 12 of the erected shell has appearances and characteristics of a half lune of the spheroid of which the shell is a hemispheroid. The base perimeter 16 of the erected hemispheroidal shelter is approximately a great circle of the spheroid and each panel and half panel edge at the hinges or fold lines 15 is a portion of a meridian of the spheroid meeting the base perimeter at approximately a spherical right angle. Whole panels 13 and 14 could, in the alternative, be located adjacent to each other causing the half panels to fold into a V-shaped space between panels 13 and 14.

The panels and half panels 12 are made of a normally flat flexible sheet material as, for example, glass fiber reinforced polyester having a high degree of resiliency and predetermined size. Since each panel 11 is a half lune, each half panel 12 forms approximately one quarter of a lune of the erected sphere and has the undeformed configuration best illustrated in Fig. 4. The half panels can be fabricated from flat stock as indicated in Fig. 4 by first shaping a flattened lune 17 having arcuate edges 18, then discarding the tips 19 (for a reason later explained) and separating the remainder of the lune along lines 20 and 21 into half panels 12. The half panels may then be stacked on a whole panel, as for example panel 13, in the manner of Figs. 6 and 7, with the arcuate edges 18 to the exterior matching edges 18 of the whole panel and straight edges 20 to the interior and may be bound with a flexible joint material in the manner illustrated in Figs. 5 and 7 to hinge edges of adjacent half panels as shown in Figs. 6 and 7. The top of the pile is finished off with an integral panel as 14. One of the whole panels, as panel 13, may be fitted with an entrance 22.

Figure 10:
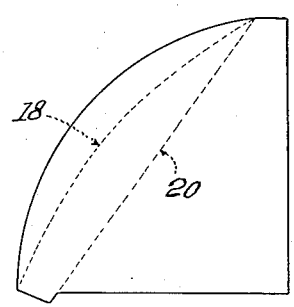
Fig. 10 is a fragmentary diagrammatic elevation of the shelter partially opened as in Fig. 8 showing an intermediate unstressed panel in broken lines.

In the erection of the shelter, the hinged panels and half panels as folded in Figs. 6 and 7 are opened to the configuration illustrated in Fig. 8 and as shown by broken lines in Figs. 9 and 10. At this position the shell resists further opening since the extremities of curved edges 18 of adjoining panels fulcrum themselves around the midpoints of those edges and place the hinges 15 under tension at the extremities of those edges. As opening progresses beyond this point, the panels are bowed into shapes approaching spherical segments by the tension between extremities of edges 18. As the shell approaches its spheroidal shape, the hinged straight edges between mating half panels are snapped outwardly to their bowed or spherical positions in which each set of edges or hinge between joined straight edges form a meridian curve of the spheroidal shape. This critical point in the opening, and of the tensioning, of the shell structure is occasioned by the behavior of the hinged straight edges of mating half panels or folded panel centerlines moving in an outwardly direction of the shell with a toggle and snap or over-center action. This peculiar action is the result of a combination of two causes. As a straight edge hinge 15 moves from the position shown in Fig. 8 in the direction indicated by an arrow to assume the bowed attitude of Fig. 2, the hinge 15 assumes, at one point, the location of a chord of its ultimate arc. Since, as apparent in Fig. 10, the hinge 15 and the straight edges joined by it are necessarily longer than the chord of the arc formed by the hinge 15 when bowed, the hinge and edges are places under axial compression when moved through the position of the chord of the arc. This compression acting on the relatively uncompressible hinge 15 causes the hinge to buckle slightly and eventually "snap" open as the hinge passes the chord or "center" position. Another and accompanying cause of the peculiar action is the conflicting bowing of the two straight edges as they pass the chord position both as a result of the buckling described and as a result of the bowing of the entire half panel. This bowing is conflicting because the central portions of the edges in attempting to occupy the same space force themselves together in the vicinity of the chord position resulting in a mutual toggling or fulcruming until the ultimate spheroidal position is approached wherein the hinge comes under tension.

In the erected position wherein each panel and half panel is bowed, the resiliency of the material and the geometry of the panels provide the stresses to maintain the position; the resiliency of each panel incidentally tending to exert a bowing influence on opposed panels. The bowing of the panels caused by the opening of hinge 15 between curved edges 18 placing hinges and panel material under tension and distortion, is in effect a stressing of the materials which are completely unstressed in the folded shell. Consequently, the shell may be considered as self-stressing upon opening.

The extreme narrow ends of the panels and half panels indicated by 19, are not used in the preferred embodiment as evident in Figs. 3, 6, and 8. These narrow portions, as previously stated, have been removed to decrease the overall length of the folded shell, to decrease the likelihood of breakage which is most likely at the narrow ends of the panels, and because the efficacy of the structure would not be particularly enhanced by use of the removed portions which would require the greatest hinge strengths and which would furnish the least panel resiliency. The resulting hole 23 in the erected shelter may be covered by a circular cap of rigid material or by flexible material such as tenting. Additionally, the hole 23 is adaptable to be used as an entrance, chimney, or observation window in circumstances of snow coverage, cold climate, or proximity to enemy action, respectively.

In the case of the preferred embodiment illustrated in Figs. 2 and 3 wherein 16 panels, i.e. 28 half and two whole panels, are used to form a hemispheroidal shell, each whole panel angle at 19, as illustrated in Fig. 4, is $360°/16$ and each whole panel base line 21 is one sixteenth of the circumference or $\pi d/16$, each half panel angle and base line being $360°/28$ and $\pi d/28$ respectively. In this particular embodiment, the arcuate panel edges are circular of radius of approximately $1\frac{1}{64}$ of the circumference of the completed shell or $\pi d(1+\frac{1}{64})$ to approximate the curvature of a sphere when distorted by the bowing of the panel during stressing. A lesser radius of curvature of the panel edges may be used to produce a flattening of the hemispheroidal shape to obtain a lower silhouette. Obviously, the preferred embodiment may be constructed with any even number of panels. However, the angle at 19, each line 21 and the radius of arcuate edge 18 vary according to the number of panels.

Figure 1:
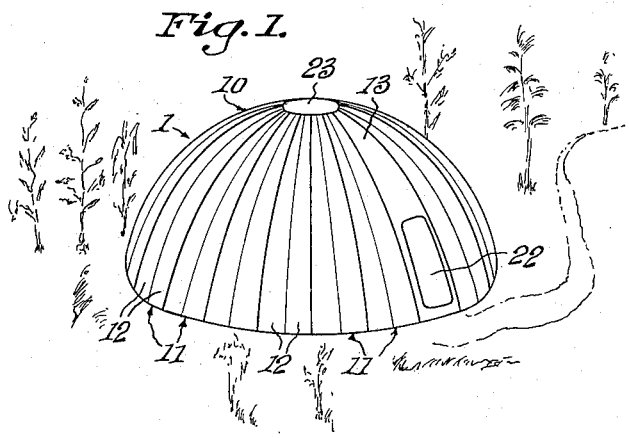
Fig. 1 is a perspective view of an erected shelter made according to a preferred embodiment of the invention.
Figure 11:
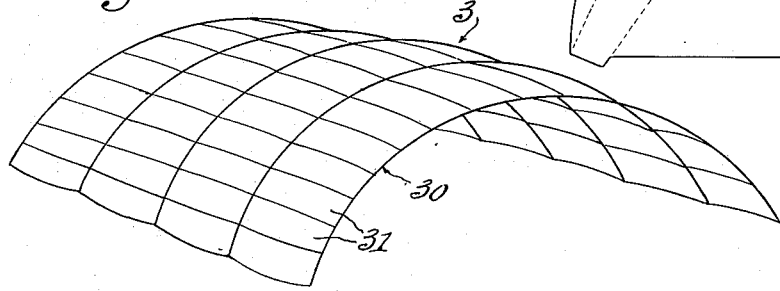
Fig. 11 is a perspective view of an articulated shelter constituting another embodiment of the invention.
Figure 12:
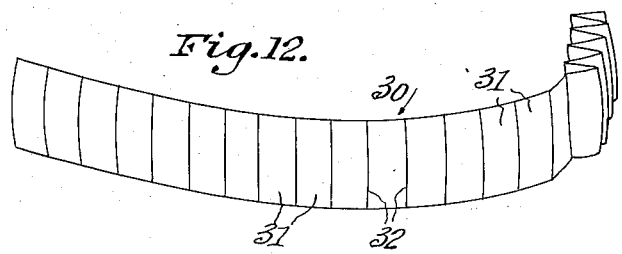
Fig. 12 is a perspective view of a partially folded segment of the articulated structure of Fig. 11.
Figure 13:
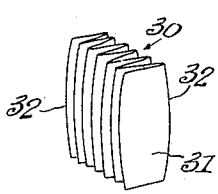
Fig. 13 is a perspective view of a completely folded segment of the structure illustrated in Fig. 11.
Figure 14:
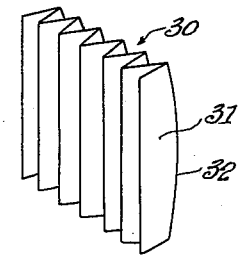
Fig. 14 is a perspective view of a folded segment of the structure illustrated in Fig. 11 wherein the panels are divided into half panels.

Figs. 11, 12, and 13 are illustrative of other embodiments of the present invention. The shelter 3 of Fig. 11, rather than being unitary in structure, is a cylindrical or arched articulation of curved, preferably barrel-shaped segments 30 secured together by any appropriate connector as, for example, double channel connecting strips. Segments 30 may be of any curvature having a surface generated by a curvilinear generatrix. Each segment 30, as best illustrated in Figs. 12 and 13, is made up of a succession of identical flat panels 31 having arcuate longitudinal edges 32 hinged together in accordion fashion by flexible hinge strips, as for example, of the type illustrated in Fig. 5. As segment 30 is expanded or stretched out to be incorporated into shelter 3, the hinged panels rotating on their flexible hinge strips are bowed by the arcuate edges 32 in the same manner as panels 11 of the preferred embodiment previously described. This bowing of panels 31 caused by the fulcruming of edges 32 about their midpoints stresses the panels into barrel stave shape. These segments, therefore, are self-stressing units of sufficient rigidity to retain a predetermined shape and to support a load. The shelter configuration of Fig. 11 is more practical for large structures than the preferred embodiment shown in Fig. 1 because of the separability of segments and is more flexible in use since any number of segments may be used. The panels 31 of segment 30 may be subdivided into half panels joined at straight edges at the panel centerline, as shown in Fig. 14, by a flexible hinge in the manner of panels 11 of the preferrred embodiment as joined at 15.

Figure 15:
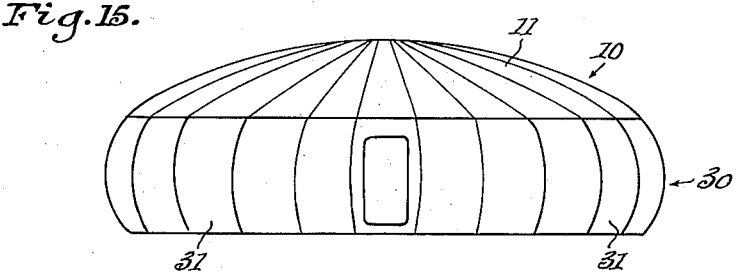
Fig. 15 is an elevation of an erected shelter made up of an articulated segment according to Fig. 12 and topped by a hemispheroidal dome according to Fig. 2.
Figure 16:
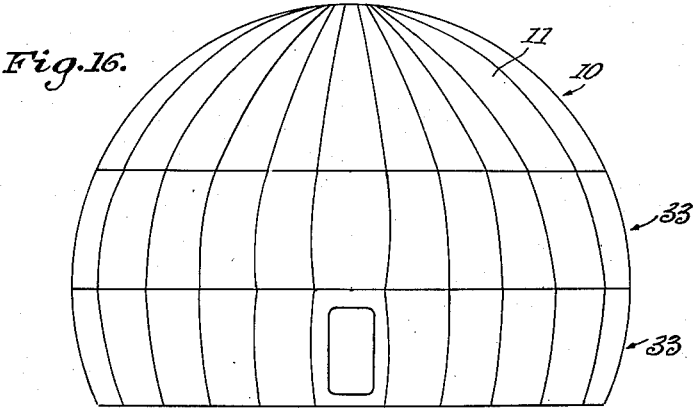
Fig. 16 is an elevation of an erected shelter similar to that of Fig. 15 with half-barrel shaped segments.
Figure 17:
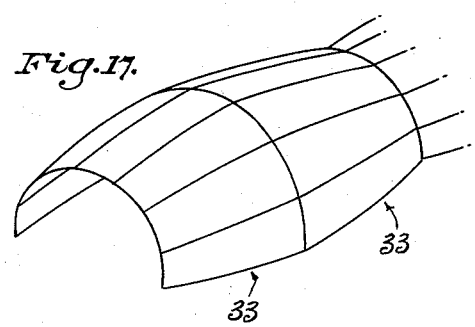
Fig. 17 is a perspective view of a shelter similar to that of Fig. 11 but using segments like those of Fig. 16.

Still other embodiments are contemplated and may be referred to briefly by description. Segments of the nature of 30 in Fig. 11 may be combined and placed on edge to fashion an upright barrel and may then be topped with a dome, spherical or parabolic, constructed in the manner of the hemispheroidal shelter of Fig 1 as illustrated in Fig. 15. Segments 33 of the nature of 30 may be fashioned in half barrel form so that two segments may be placed with running edges of larger dimension joined to form a barrel, with opposite abutting panels of the joined segments representing staves, either as a complete upright enclosure that may be topped with a dome as shown in Fig. 16 or as a rounded top articulated tunnel type as illustrated in Fig. 17. Size limitations of these other embodiments or the embodiments more fully described are not inherent in the concept of the invention but result solely from characteristics of the materials. Materials appropriate to any size structure may be selected from those commercially available.

Although the above descriptions have been directed to use of the structures incorporating the novelty of the invention as shelters and particularly troop or personnel structures, this use forms no limitation on the invention since structures according to this disclosure can be constructed for use as warehouse or supply shelters; as garages or hangars; as storage units or bins for grain, coal, sand, etc.; for use as liquid containers when provided with liquid impervious liners; or as forms for concrete or other plastics. Further, it is contemplated that any of the structures according to this invention may receive liners, flooring, etc., for insulation, etc. to accommodate the structure to a particular purpose or use.

I claim:

1. A folding, self-stressing, self-supporting, articulated, prefabricated, cylindrical shelter consistion of a plurality of curved, edge abutting, barrel-like segments removably secured together wherein each segment consists of a series of normally flat flexible panels joined edge-to-edge by flexible hinge means, said panels having substantial resiliency and having arcuate hinged edges, whereby the panels of each segment when folded lie face-to-face in superimposed relationship and the panels of the segment when extended lie edge-to-edge in a continuous curve and are bowed and tensioned into a barrel stave shape.

2. The structure of claim 1 wherein some of the panels are subdivided into half panels by straight centerline flexible hinges.

3. A construction for a folding, self-stressing, self-supporting, prefabricated hemispheriodal shelter adapted to rest on its equatorial edge when erected, comprising a hemispheroidal shell of resiliently flexible material, said shell being divided into a plurality of truncated half-lune whole panels and half panels along meridian lines divergent from the top of the shell, said panels being joined in edge abutting fashion along said meridian lines by flexible hinge means, said whole panels and half panels being normally planar but stressed into curved surfaces by their mutual interaction, said shell being collapsible by forcing those said flexible hinge means along quadrant lines which join adjacent half panels inwardly through a state of compression causing flexing of all said hinge means to cause adjacent panels and half panels in their folded shelter positions to lie in stacked surface abutting relationship to each other, said whole panels and half panels on collapsing of the shelter assuming their normal planar configuration, said whole panels in their normal planar configuration having identically curved edges at the hinged meridian lines, said half panels in their normal planar configuration each having one curved edge and one straight edge at the hinged lines and being joined to a whole panel at its curved edge and to another half panel at its straight edge.

4. A hemispheroidal shelter having a foldable wall of resiliently flexible material foldable zig-zag fashion along meridian fold lines, said fold lines subdividing the wall into half-lune shaped whole panels and half panels, said whole panels and half panels being planar in unflexed condition, said panels each having two longitudinally curved meridian edges converging from a straight base edge to a straight terminal edge to approximate the area of a lune between the minor axis and a line parallel to the minor axis proximate the angle of the lune, said half panels each being a half of a whole panel divided along its longitudinal center and each having one curved and one straight longitudinal edge, said fold lines being composed of elongated hinge means interconnecting unitary whole panels and half panels along their longitudinal edges, said whole and half panels being interconnected by said hinge means with curved longitudinal whole panel and half panel edges abutting each other in pairs and with straight longitudinal half panel edges abutting each other in pairs, said fold lines at a pair of straight longitudinal half panel edges moving inwardly of the shelter on folding of the shelter, said fold lines which are formed by the straight half panel edges passing through a state of compression with an over-center action on both the folding and erecting of the shelter.

5. A shelter having a folding wall comprising an articulated series of resiliently flexible planar panels each having two arcuate longitudinal edges converging from a base to a restricted top with many of said panels being divided along their longitudinal centers into half panels, and elongated flexible hinge means joining each pair of half panels along the panel centers and elongated flexible hinge means interconnecting and joining adjacent panels of the series along proximate arcuate longitudinal edges, said panels being stressed from their planar state into compoundly curved surfaces to form a hemispheroid by the stress maintained by tensions created by the resiliency of the panels acting through the hinge means, said shelter being foldable by forcing alternate flexible hinges inwardly of the hemisphere through compressive positions of the chords of arcs of said flexible hinges on the hemisphere thereby forming accordion folds.

6. A shelter consisting of a series of generally elongated V-shaped portions of resiliently flexible planar sheet material each having at least one longitudinal edge convexly arcuate, the remaining edges being straight, and having elongated flexible hinge means interconnecting each portion between two other similarly aligned portions, said portions being interconnected in longitudinal edge to longitudinal edge contact for hinged movement of joined portions through dihedral angles with some alternate dihedral angles being oppositely directed, whereby the angles may be closed to fold the portions on themselves in zig-zag fashion or opened to create an extended surface, said longitudinal edges of adjoining portions being joined at said hinge means in arcuate-to-arcuate and in straight-to-straight pairs whereby the arcuate edge to arcuate edge abutment of portions at hinge means causes a fulcruming of the panels about the points of maximum compression between abutting arcuate edges to bow and stress the said planar portions into compoundly curved surfaces constituting half-lune sectors of a hemispheroidal surface.

7. A concavo-convex shelter having a folding wall comprised of an articulated series of resiliently flexible planar panels each having two similar convex arcuate edges, and flexible hinge means attached to said arcuate edges interconnecting successive panels in said series; the shelter when in folded condition having the hinge means flexed with the panels lying in an accordion stack in planar unstressed state with successive panels in face abutting relationship with like arcuate edges of successive panels superimposed, and having said flexible hinge means holding said edges in the superimposed position; the shelter when in unfolded, erected condition having panels stressed from their planar unstressed configuration into a compound curvature to develop the concavo-convex shape of the shelter and said flexible hinge means each holding the edges to which each hinge means is attached in edge abutting contiguous position to stress said panels; each said flexible hinge means of the shelter, with its interconnected arcuate edges, which approaches its erected surface position from the interior of the shelter during erection passing through a state of compression with an over-center snap action to a state of stable stress; during folding of the shelter each flexible hinge means which moves to the interior of the shelter on folding passing through a state of compression with an over-center snap action to an unstressed state whereby stressing of panels and hinge means during erection of the shelter will support the shelter in a concavo-convex shape without application of exterior forces and folding of the shelter will permit movement and storage of the shelter in a compact unstressed position.

8. A shelter consisting of a seriees of generally elongated quadrangular portions of resiliently flexible planar sheet material each having at least one longitudinal edge convexly arcuate, the remaining edges being straight, and having elongated flexible hinge means interconnected each portion into the series between two other portions, said portions being interconnected in longitudinal edge to longitudinal edge contact for hinged movement of joined portions through dihedral angles with some alternate dihedral angles being oppositely directed, whereby the angles may be closed to fold the portions on themselves in zig-zag fashion or opened to create an extended surface, said longitudinal edges of adjoining portions being joined at said hinge means in identically shaped pairs whereby the arcuate edge to arcuate edge abutment of portions at hinge means causes a fulcruming of the panels about the points of maximum compression between abutting arcuate edges to bow and stress the said planar portions into compoundly curved surfaces constituting sectors of a compoundly curved surface.

9. A concavo-convex shelter having a folding wall comprising an articulated series of resiliently flexible planar panels each having two arcuate longitudinal edges converging from a first to a second end with many of said panels being divided along their longitudinal centers into half panels and elongated flexible hinge means joining each pair of half panels along the panel centers and elongated flexible hinge means interconnecting and joining adjacent panels of the series along proximate arcuate longitudinal edges, said panels being stressed from their planar state into compoundly curved surfaces to form a regular concavo-convex surface by the stress maintained by tensions created by the resiliency of the panels acting through the hinge means, said shelter being foldable by forcing alternate flexible hinges inwardly of the hemisphere through compressive positions of the chords of arcs of said flexible hinges on the regular concavo-convex surface thereby forming accordion folds.

10. A folding, self-stressing, self-supporting, prefabricated structure comprising an articulated series of similar normally planar panels of substantially resilient flexible sheet material, said panels each having a pair of opposite joining edges, at least one joining edge of each panel being arcuate, the remaining joining edges being straight, adjacent panels of the series being joined by elongated flexible hinge means interconnecting a joining edge of each two adjacent panels along the lengths of the joining edges to form hinge joints between successive panels and the articulations in the series, said panels being flat, unstressed and surface abutting when the structure is folded and being curved, stressed and edge abutting when the structure is unfolded.

11. The structure of claim 10, wherein some pairs of successive panels have arcuate joining edges exteriorly of the pair of panels and straight joining edges between the pair so that the flexible hinge means joining the pair of straight joining edges constitutes a joint medially of the two panels constituting the pair and wherein arcuate edges are connected only to arcuate edges and straight joining edges only to straight joining edges in the series.

12. The structure of claim 7, wherein said panels are elongated and said arcuate edges of each panel are longitudinal edges and wherein some of said panels are provided with a median fold between said arcuate edges, said median folds being a straight line of folds in said panels when the panels are in unstressed planar condition and said median folds which move inwardly of the shelter during folding are passed through a state of compression with an over-center snap action both during folding and during erection of the shelter.

13. The structure of claim 12 wherein said arcuate longitudinal edges join equal length parallel edges.

14. The structure of claim 12, wherein said arcuate longitudinal edges are convergent from a third edge, each of said panels has the form of a truncated half lune and said median fold comprises a flexible hinge means interconnecting two half panels, said half panels being a panel divided along its median with respect to said arcuate longitudinal edges.

References Cited in the file of this patent
UNITED STATES PATENTS

| | | |
|---|---|---|
| 146,271 | Packer | Jan. 6, 1874 |
| 1,834,084 | Barnes | Dec. 1, 1931 |
| 1,910,828 | Flanders | May 23, 1933 |

FOREIGN PATENTS

| | | |
|---|---|---|
| 23,290 | Great Britain | Nov. 30, 1914 |
| 71,414 | Norway | Dec. 23, 1946 |
| 114,827 | Australia | Mar. 19, 1942 |